Oct. 24, 1950 G. H. LOVETT 2,526,676
PROCESS FOR PRODUCING ACRYLONITRILE
Filed June 24, 1949
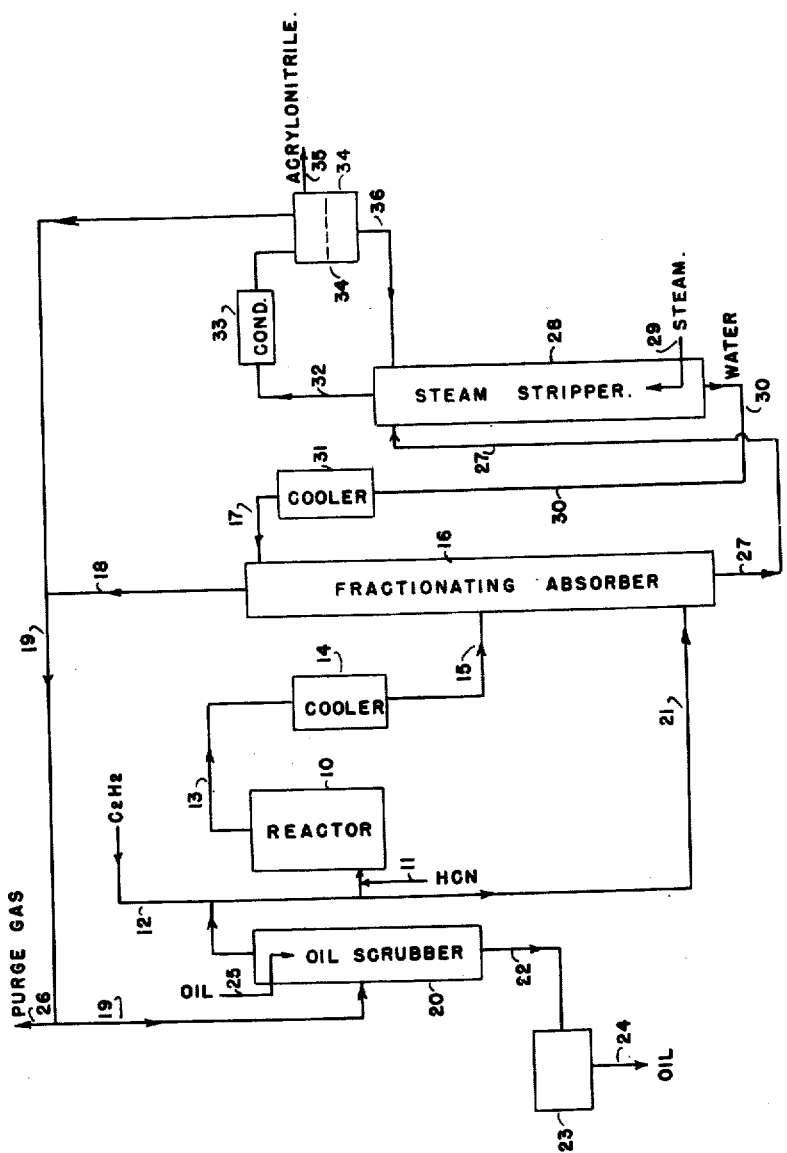
INVENTOR.
GORDON H. LOVETT.
BY Herman O. Bauermeister
his attorney Patented Oct. 24, 1950

2,526,676

UNITED STATES PATENT OFFICE 2,526,676

PROCESS FOR PRODUCING ACRYLONITRILE

Gordon H. Lovett, Dayton, Ohio, assignor to Monsanto Chemical Company, St. Louis, Mo., a corporation of Delaware Application June 24, 1949, Serial No. 101,201

13 Claims. (Cl. 260—465.3)

This invention provides an improved process for producing acrylonitrile from acetylene and hydrocyanic acid.

When acrylonitrile is formed by the reaction of acetylene with hydrocyanic acid in the presence of acidic cuprous chloride solution, as described in BIOS (British Intelligence Objectives Sub-Committee, 1947; London, England) Report 1057, and also in U. S. Patent 2,409,124 of October 8, 1946, a crude product is obtained which contains principally acrylonitrile, together with minor amounts of 2-chlorobutadiene, monovinyl acetylene and divinyl acetylene. It is customary in this process to absorb the crude acrylonitrile vapor formed in the catalytic reaction zone in water in order to separate the excess acetylene which is then recycled.

When distillation of water solutions of crude acrylonitrile is attempted, the more volatile chlorobutadiene and monovinyl acetylene are first vaporized and thus separated from the higher boiling acrylonitrile. However, it has been found that during distillation of the crude product, these more volatile materials undergo polymerization, with the result that the upper part of the distillation column in which such distillation is carried out, is rapidly filled with a solid polymer, making necessary the frequent interruption of the operation for cleaning purposes. It has also been found that the acrylonitrile and divinyl acetylene form an azeotrope boiling at 75° C., whereas pure acrylonitrile boils at 77° C., both temperatures at atmospheric pressure. This fact further complicates the production of a grade of acrylonitrile suitable for the production of high molecular weight polymers.

Essentially my invention contemplates the purification of acrylonitrile from accompanying gaseous and liquid impurities. The impure stream of acrylonitrile is absorbed in a body or stream of water, which is then contacted with a gas such as a stream of gaseous acetylene. In this way a fractionation takes place by the stripping action of the acetylene, such as by counter-current contacting or similar means. This gas stripping removes the volatile impurities with the acetylene, so that water-insoluble gaseous impurities such as 2-chlorobutadiene, monovinyl acetylene, divinylacetylene, etc. are removed from the water solution of acrylonitrile. This solution, substantially free from gaseous impurities, is then subjected to steam stripping for recovery of the acrylonitrile.

The gas fraction consisting of acetylene and the volatile impurities is passed into an oil absorber. Here the oil-soluble impurities, such as 2-chlorobutadiene, monovinyl acetylene, and divinyl acetylene are preferentially absorbed in a suitable oil medium, such as wash oil or other non-reactive aliphatic or aromatic solvents, while the acetylene passes on to be used in the acrylonitrile process.

I have found that the difficulty attending the distillation of crude acrylonitrile, or water solutions of the same, may be overcome by contacting the water solutions thereof with a stream of gas, preferably acetylene, in an amount sufficient to absorb in the gas phase the impurities present, particularly chlorobutadiene, monovinyl acetylene and divinyl acetylene. By this means the water solutions of acrylonitrile are substantially freed of readily polymerizable or azeotrope-forming substances, so that further distillation can be accomplished on a continuous basis without encountering polymer formation during distillation. The process of the present invention may be carried out at atmospheric pressure, or may employ super-atmospheric pressure, such as two atmospheres if desired. I have further found that I may produce acrylonitrile from acetylene and hydrocyanic acid by subjecting a mixture of acetylene and hydrocyanic acid to the catalytic action of an acid solution of cuprous chloride to form a gaseous reaction product of acrylonitrile containing small amounts of chlorobutadiene, monovinyl acetylene and divinyl acetylene, together with unreacted acetylene and hydrogen cyanide, as well as other impurities, such as acetaldehyde, cyanobutadiene and lactonitrile. The gaseous reaction product so obtained is passed to a water scrubber, whereby the acrylonitrile, chlorobutadiene, monovinyl acetylene, divinyl acetylene, hydrocyanic acid, cyanobutadiene and lactonitrile are dissolved. The solution so formed is contacted with gaseous acetylene in amount sufficient to transfer to the gas phase substantially all of the chlorobutadiene, monovinyl acetylene and divinyl acetylene, thus freeing the water solutions of those constituents which have a pronounced tendency to polymerize. The acetylene containing the chlorobutadiene, monovinyl acetylene and divinyl acetylene may then be passed through an oil scrubber or other absorption device or means, such as shown in U. S. Patent 2,385,470 of September 25, 1945, in which acetylene is contacted with a hydrocarbon oil or other adsorbent and the impurities removed therefrom. The acetylene which has thus been freed of the impurities is then recycled to the catalytic reaction zone for the synthesis of additional acrylonitrile. Since the monovinyl acetylene is removed by the acetylene gas first from the acrylonitrile-water solution, and then from the acetylene by the absorption means, mentioned above, a smaller amount of the objectionable divinyl acetylene is formed in my process. Accordingly, by means of my present invention, not only are the impurities normally contained in the acetylene gas leaving the catalytic reactor removed from the recycled acetylene gas, but also the impurities contained in the crude acrylonitrile-water solution are likewise removed with the aid of the make-up acetylene supplied to the process. By this means I am enabled to obtain a pure acrylonitrile without the difficulties encountered in prior processes. The scrubbing step may also be carried out with other non-aqueous solvents or wash oils which may be aromatic or aliphatic in character, such as refined hydrocarbon or mineral oils. However, glycerine, glycol and other higher alcohols, as well as higher esters, such as dibutyl phthalate may likewise be employed.

Advantageously the acetylene contacted with the water solution of crude acrylonitrile consists of "make-up" acetylene and of a part of the recycle acetylene. The total amount of acetylene contacted with the water solution of acrylonitrile is in the neighborhood of 507 pound moles per 100 pound moles of acrylonitrile, for example, although this ratio may be varied.

My invention is illustrated by means of the accompanying drawing, illustrating a flow sheet of the process in which only the essential elements are shown.

In the drawing, 10 indicates a reactor containing a hydrochloric acid solution of cuprous chloride, 11 indicates a supply of hydrocyanic acid (HCN), while 12 indicates a supply of acetylene ($C_2H_2$). Generally the amount of acetylene supplied to the reactor is from 8 to 10 times the molar equivalent of hydrogen cyanide, although this ratio also is variable, depending upon the activity and age of the catalytic solution. The products of reaction leave the reactor by pipe 13 and comprise the following in the approximate proportions indicated:

| | Moles |
|---|---|
| Acrylonitrile | 13.8 |
| Acetylene | 146.0 |
| Hydrocyanic acid | 1.0 |
| Acetaldehyde | 0.8 |
| Chlorobutadiene | 0.1 |
| Monovinyl acetylene | 1.1 |
| Divinyl acetylene | 0.04 |
| Cyanobutadiene | 0.47 |
| Lactonitrile | 0.25 |

The above products are cooled in cooler 14 and then passed by means of pipe 15 into the fractionating absorber 16. The acrylonitrile and associated impurities are dissolved in the water which is supplied to this absorber by pipe 17. The acetylene being largely insoluble in water passes out of the absorber by pipe 18, enters pipe 19 and thence oil scrubber 20.

The fractionating absorber may be fed with an inert gas such as nitrogen which may be introduced at a low point to strip out or fractionate volatile impurities. However, it is preferred to use acetylene for this purpose. Acetylene gas enters the lower part of fractionating absorber 16 by means of pipe 21 in an amount sufficient to transfer to the gas phase substantially all of the chlorobutadiene, monovinyl acetylene and divinyl acetylene. The acetylene thus introduced mixes with the excess acetylene present in the reaction product which enters absorber 16 by means of pipe 15. The combined volume of acetylene containing the impurities leaves by pipe 18, enters pipe 19 and thence enters oil scrubber 20. The oil in the scrubber dissolves the chlorobutadiene, monovinyl acetylene and divinyl acetylene present in the acetylene so that these impurities are carried out of the scrubber by pipe 22, entering purifying means 23, wherein the impurities are removed by various methods such as by chlorination, oxidation or polymerization. The purified oil leaves by means of pipe 24 and is reintroduced to oil scrubber, if desired, at pipe 25. A continuous or intermittent purge of a part of the recycled acetylene is provided at 26 in order to keep the inert gases present therein at a low percentage. However, the entire recycle stream may be recycled if desired.

Returning now to the fractionating absorber 16, the water solution of acrylonitrile, from which the chlorobutadiene, monovinyl acetylene and divinyl acetylene have been substantially completely removed, passes into pipe 27 and enters the stripper 28. This device is supplied with a source of heat such as steam by pipe 29, the heat thus introduced serving to boil substantially all of the acrylonitrile out of the water solution. The water thus denuded of acrylonitrile leaves by pipe 30, and may flow through cooler 31 and enter pipe 17 to be returned to absorber 16.

The volatilized acrylonitrile passes out of stripper 28 into pipe 32, enters condenser 33 and is therein liquefied. The liquid product being a mixture of acrylonitrile and water enters separator 34, wherein two layers are formed. The upper layer formed therein consists of acrylonitrile containing from 5% to 8% of water, while the lower layer consists of water containing from 5% to 8% of acrylonitrile. The upper layer is withdrawn by means of pipe 35 and, if desired, may be subsequently dehydrated in known manner. The lower water layer leaves by pipe 36 and is returned to steam stripper 28 for further treatment therein.

While I have described a preferred form of my invention, it is understood that this is by way of illustration only, and various changes may be made within the scope of the appended claims without departing from the spirit of the invention.

The above exemplification has been described with reference to an acrylonitrile process employing a particular liquid phase catalyst. However, the present invention likewise contemplates the use of other catalysts, and also other acrylonitrile production methods, such as the ethylene oxide-hydrocyanic acid process and also operations in the vapor phase. My invention may advantageously be employed with various sources of crude arcylonitrile, since the efficiency of the present purification process serves to render the various production methods more economical in the purification of acrylonitrile for various technical purposes.

What I claim is:

1. The process which comprises contacting a water solution of acrylonitrile containing chlorobutadiene, monovinyl acetylene and divinyl acetylene, with gaseous acetylene, whereby substantially all of the said chlorobutadiene, monovinyl acetylene and divinyl acetylene is transferred to the gas phase and a water solution of acrylonitrile substantially free of chlorobutadiene, monovinyl acetylene and divinyl acetylene is obtained.

2. The process which comprises contacting a water solution of acrylonitrile, said acrylonitrile resulting from the cuprous chloride catalyzed reaction of acetylene and hydrogen cyanide and having associated therewith chlorobutadiene, monovinyl acetylene and divinyl acetylene as impurities, with acetylene in the gas phase, whereby substantially all of the chlorobutadiene, monovinyl acetylene and divinyl acetylene is transferred to the gas phase and a water solution of acrylonitrile substantially free of chlorobutadiene, monovinyl acetylene and divinyl acetylene is obtained.

3. The process which comprises contacting a water solution of acrylonitrile, said acrylonitrile resulting from the cuprous chloride catalyzed reaction of acetylene and hydrogen cyanide and having associated therewith chlorobutadiene, monovinyl acetylene and divinyl acetylene as impurities, with acetylene in the gas phase and at substantially atmospheric pressure, whereby substantially all of the chlorobutadiene, monovinyl acetylene and divinyl acetylene are transferred to the gas phase, and a water solution of acrylonitrile substantially free of chlorobutadiene, monovinyl acetylene and divinyl acetylene is obtained.

4. The process for synthesizing acrylonitrile which comprises contacting a water solution of acrylonitrile containing chlorobutadiene, monovinyl acetylene and divinyl acetylene as dissolved impurities therein, with acetylene in the gas phase, whereby substantially all of the chlorobutadiene, monovinyl acetylene and divinyl acetylene and divinyl acetylene are transferred to the acetylene, contacting said acetylene with a hydrocarbon solvent, whereby said chlorobutadiene, monovinyl acetylene and divinyl acetylene are transferred to said hydrocarbon solvent and a purified acetylene gas obtained, mixing said purified acetylene gas with hydrocyanic acid and contacting the mixture of acetylene and hydrocyanic acid with a hydrochloric acid cuprous chloride catalyst solution, whereby acrylonitrile containing chlorobutadiene, monovinyl acetylene and divinyl acetylene is obtained.

5. The process for synthesizing acrylonitrile which comprises contacting a water solution of acrylonitrile, containing chlorobutadiene, monovinyl acetylene and divinyl acetylene as dissolved impurities therein with acetylene, whereby substantially all of the chlorobutadiene, monovinyl acetylene and divinyl acetylene are transferred to the acetylene, contacting said acetylene with a hydrocarbon solvent, whereby said chlorobutadiene, monovinyl acetylene and divinyl acetylene are transferred to said hydrocarbon solvent and a purified acetylene gas is obtained, passing said purified acetylene gas into a hydrochloric acid solution of cuprous chloride containing hydrocyanic acid, whereby gaseous acrylonitrile containing chlorobutadiene, monovinyl acetylene and divinyl acetylene is obtained and passing said acrylonitrile into water to form said water solution.

6. The process for synthesizing acrylonitrile which comprises contacting a water solution of acrylonitrile, containing chlorobutadiene, monovinyl acetylene and divinyl acetylene as dissolved impurities therein with acetylene in the gas phase, whereby substantially all of the chlorobutadiene, monovinyl acetylene and divinyl acetylene are transferred to the acetylene gas phase, and a water solution of acrylonitrile substantially free of chlorobutadiene, monovinyl acetylene and divinyl acetylene is obtained, contacting said acetylene gas phase with a liquid which has a high solubility for said chlorobutadiene, monovinyl acetylene and divinyl acetylene, but has low solubility for said acetylene, passing said acetylene into a hydrochloric acid solution of cuprous chloride containing hydrocyanic acid whereby acrylonitrile containing chlorobutadiene, monovinyl and divinyl acetylene is obtained and passing said acrylonitrile, chlorobutadiene, monovinyl acetylene and divinyl acetylene into water to form said water solution.

7. In the process for synthesizing acrylonitrile in which hydrocyanic acid and acetylene are reacted in an acid cuprous chloride solution to form crude acrylonitrile containing chlorobutadiene, monovinyl acetylene and divinyl acetylene as impurities therein and the acrylonitrile and said impurities are dissolved in water to form a solution therein, the steps of contacting said water solution with acetylene gas in amount sufficient to remove said chlorobutadiene, monovinyl acetylene and divinyl acetylene from said water solution, then removing said impurities from said acetylene and then passing said acetylene together with hydrocyanic acid into said acid cuprous chlorine solution to form acrylonitrile.

8. In the process for synthesizing acrylonitrile in which hydrocyanic acid and an excess of acetylene are reacted in an acid cuprous chloride solution to form a crude acrylonitrile containing polymerizable impurities and said crude acrylonitrile is dissolved in water, the steps of contacting said water solution containing said acrylonitrile and impurities with acetylene in such amount as to remove therefrom substantially all of said impurities, without, however, removing any substantial amount of acrylonitrile, then passing said acetylene containing said polymerizable impurities into contact with an absorption material to remove said impurities and to purify the acetylene, and then passing said acetylene together with hydrocyanic acid into said acid cuprous chloride solution to form additional acrylonitrile.

9. In the process for the purification of acrylonitrile containing water-soluble, oil-soluble impurities, the improvement which comprises contacting a stream of said impure acrylonitrile with a body of water to dissolve the said impurities, thereafter contacting said body of water with a stream of acetylene to strip the said impurities from said body of water, withdrawing the said stream of acetylene together with accompanying impurities, contacting said stream with a body of oil to remove therefrom the said oil-soluble impurities and thereafter withdrawing from said body of oil a stream of acetylene for processing to obtain acrylonitrile.

10. In a process for the purification of acrylonitrile containing water-soluble, oil-soluble impurities by contacting the same with a stream of water, the improvement which comprises adding a stream of acetylene counter-current to the flow of said stream of water, whereby water-soluble impurities are retained by said stream of water and are carried with said stream of water together with the said acrylonitrile, withdrawing from the said stream of water the said acetylene and accompanying impurities, contacting said stream of acetylene and impurities with a stream of oil whereby said impurities are removed, and passing said purified acetylene to a reaction zone for the production of acrylonitrile.

11. A process as defined in claim 10, wherein the said purification is carried out at atmospheric pressure.

12. A process for purifying a water solution of acrylonitrile containing volatile impurities which comprises contacting said water solution with acetylene and thereafter withdrawing said acetylene together with said volatile impurities to obtain a water solution of acrylonitrile substantially free of volatile impurities.

13. The process which comprises contacting a water solution of acrylonitrile containing water-soluble, oil-soluble impurities dissolved therein, with acetylene in the gas phase, whereby the said impurities are transferred to the acetylene, contacting said acetylene with a hydrocarbon solvent, whereby the said water-soluble, oil-soluble impurities are transferred to said hydrocarbon solvent, and thereafter withdrawing from said body of hydrocarbon solvent a stream of acetylene.

GORDON H. LOVETT.

REFERENCES CITED

The following references are of record in the file of this patent:

UNITED STATES PATENTS

| Number | Name | Date |
| --- | --- | --- |
| 2,324,854 | Kurtz et al. | July 20, 1943 |
| 2,385,327 | Bradley et al. | Sept. 25, 1945 |